United States Patent
Liu et al.

(10) Patent No.: US 10,172,146 B2
(45) Date of Patent: Jan. 1, 2019

(54) WI-FI AND BLUETOOTH COEXISTENCE

(71) Applicant: Apple Inc., Cupertino, CA (US)

(72) Inventors: Yong Liu, Campbell, CA (US); Christiaan A. Hartman, San Jose, CA (US); Siegfried Lehmann, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 15/272,519

(22) Filed: Sep. 22, 2016

(65) Prior Publication Data

US 2017/0094677 A1 Mar. 30, 2017

Related U.S. Application Data

(60) Provisional application No. 62/234,847, filed on Sep. 30, 2015.

(51) Int. Cl.
| | |
|---|---|
| *H04W 72/12* | (2009.01) |
| *H04W 72/04* | (2009.01) |
| *H04W 84/12* | (2009.01) |
| *H04W 4/80* | (2018.01) |

(52) U.S. Cl.
CPC ... *H04W 72/1215* (2013.01); *H04W 72/0446* (2013.01); *H04W 4/80* (2018.02); *H04W 84/12* (2013.01)

(58) Field of Classification Search
CPC .................. H04W 72/0446; H04W 72/1215
See application file for complete search history.

(56) References Cited

U.S. PATENT DOCUMENTS

| | | |
|---|---|---|
| 8,160,001 B2 | 4/2012 | Bitran |
| 8,554,137 B2 | 10/2013 | Wyper et al. |
| 2005/0025174 A1* | 2/2005 | Fischer ................. H04W 88/06 370/445 |

(Continued)

OTHER PUBLICATIONS

Ophir et al., WI-FI (IEEE802.11) and Bluetooth Coexistence: Issues and Solutions; Published in: Personal, Indoor and Mobile Radio Communications, 2004. PIMRC 2004. 15th IEEE International Symposium on Date of Conference: Sep. 5-8, 2004 Date Added to IEEE Xplore: Jan. 3, 2005 (Year: 2004).*

*Primary Examiner* — Gary Mui
(74) *Attorney, Agent, or Firm* — Meyertons Hood Kivlin Kowert & Goetzel, P.C.; Jeffrey C. Hood; Brian E. Moore

(57) ABSTRACT

In embodiments, one or more wireless stations operate to configure direct communication with neighboring mobile stations, i.e., direct communication between the wireless stations without utilizing an intermediate access point. Embodiments of the disclosure relate a mechanism for coexistence of various radio access technologies during peer-to-peer communications. In some embodiments, a first communication may be scheduled in one or more time slots with a peer station according to a first radio access technology (RAT), an end time of the first communication during a first time slot of the one or more time slots may be determined, and a second communication according to a second RAT may be transmitted. At least a portion of the second communication may be performed during the first time slot. In some embodiments, the first and second communications may be transmitted on the same channel.

20 Claims, 10 Drawing Sheets

(56) References Cited

U.S. PATENT DOCUMENTS

| | | | |
|---|---|---|---|
| 2006/0292986 A1* | 12/2006 | Bitran | H04W 16/14 455/41.2 |
| 2007/0281617 A1* | 12/2007 | Meylan | H04W 16/14 455/41.2 |
| 2008/0259846 A1* | 10/2008 | Gonikberg | H04W 72/1215 370/328 |
| 2010/0182981 A1* | 7/2010 | Thoukydides | H04J 3/0658 370/336 |
| 2012/0188907 A1* | 7/2012 | Dayal | H04W 72/1215 370/254 |
| 2012/0218979 A1* | 8/2012 | Yeh | H04W 52/0216 370/338 |
| 2013/0260686 A1* | 10/2013 | Mukherjee | G06F 9/5027 455/41.2 |
| 2014/0219193 A1* | 8/2014 | Linde | H04W 72/1215 370/329 |
| 2016/0157162 A1 | 6/2016 | Batta et al. | |
| 2016/0234696 A1* | 8/2016 | Looker | H04B 1/44 |

* cited by examiner

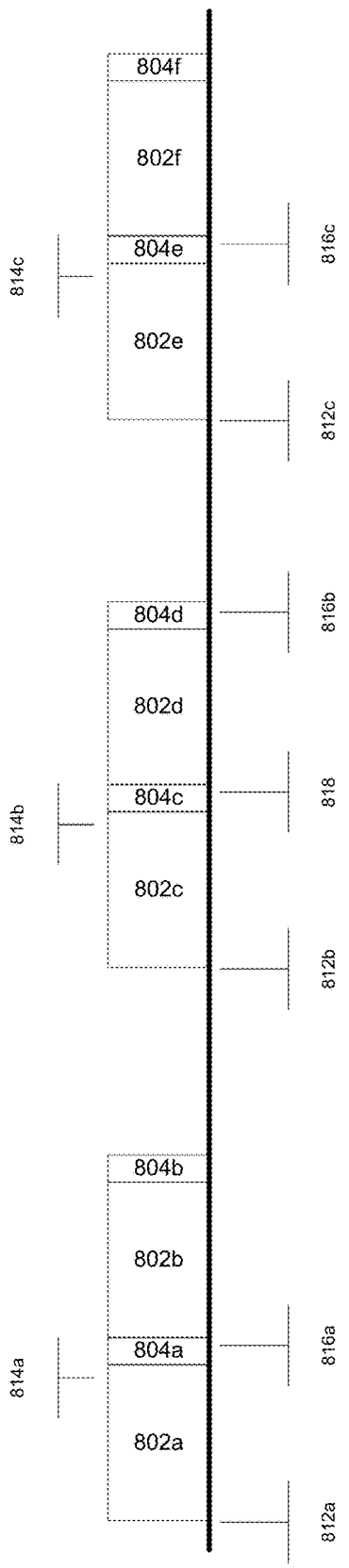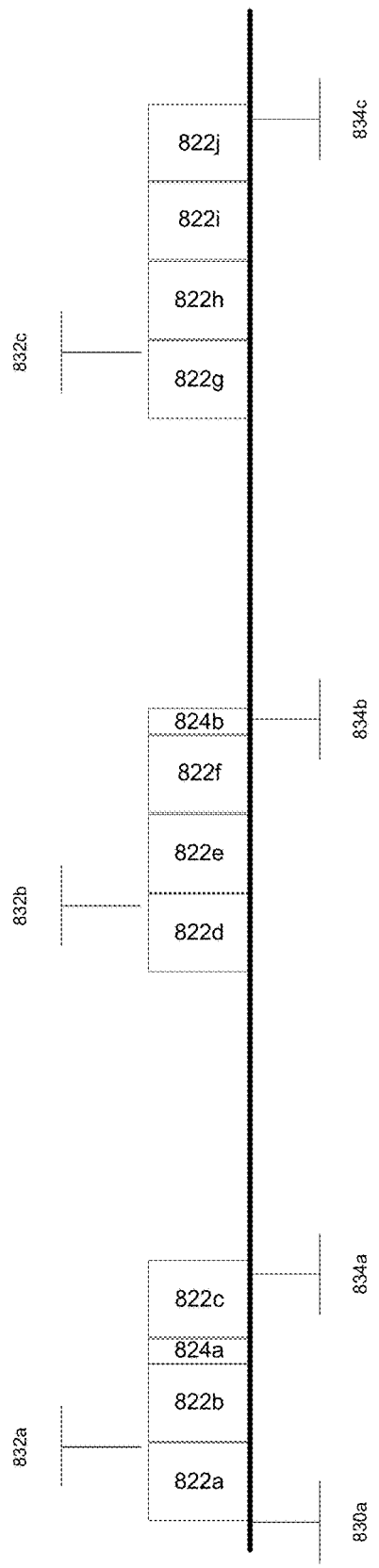
FIG. 8A
FIG. 8B

WI-FI AND BLUETOOTH COEXISTENCE

PRIORITY DATA

This application claims the benefit of priority to U.S. Provisional Application Ser. No. 62/234,847, titled "Wi-Fi and Bluetooth Coexistence", filed Sep. 30, 2015, by Yong Liu, Christiaan A. Hartman, and Siegfried Lehmann, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to a system and method of NAN datapath quality of service support.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate to configure peer-to-peer wireless communications—direct communication with neighboring wireless stations (e.g., without utilizing an intermediate access point). Embodiments of the disclosure relate a mechanism for coexistence of various radio access technologies during peer-to-peer communications. In some embodiments, a first communication may be scheduled in one or more time slots with a peer station according to a first radio access technology (RAT), an end time of the first communication during a first time slot of the one or more time slots may be determined, and a second communication according to a second RAT may be transmitted. At least a portion of the second communication may be performed during the first time slot. In some embodiments, the first and second communications may be transmitted on the same channel.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 8A and 8B illustrate example coexistence techniques, according to embodiments.

Figure 1:
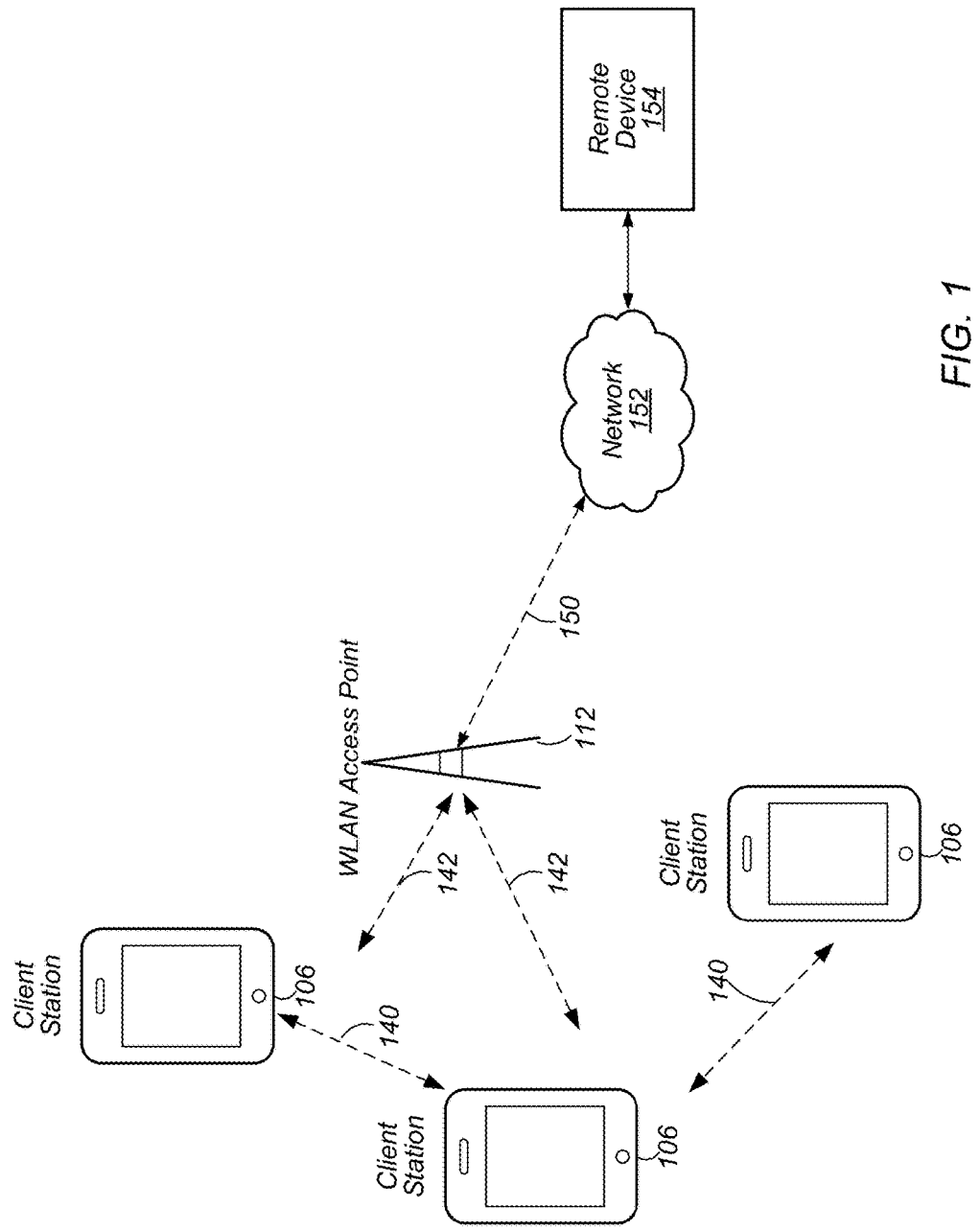
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function

TERMINOLOGY

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for scheduling a first communication in one or more time slots with a peer station according to a first radio access technology (RAT), determining an end time of the first communication during a first time slot of the one or more time slots, and transmitting a second communication according to a second RAT where at least a portion of the second communication may be performed during the first time slot. In some embodiments, the first and second communications may be transmitted on the same channel. In some embodiments the first RAT may be Bluetooth and the second RAT may be Wi-Fi.

Figure 2:
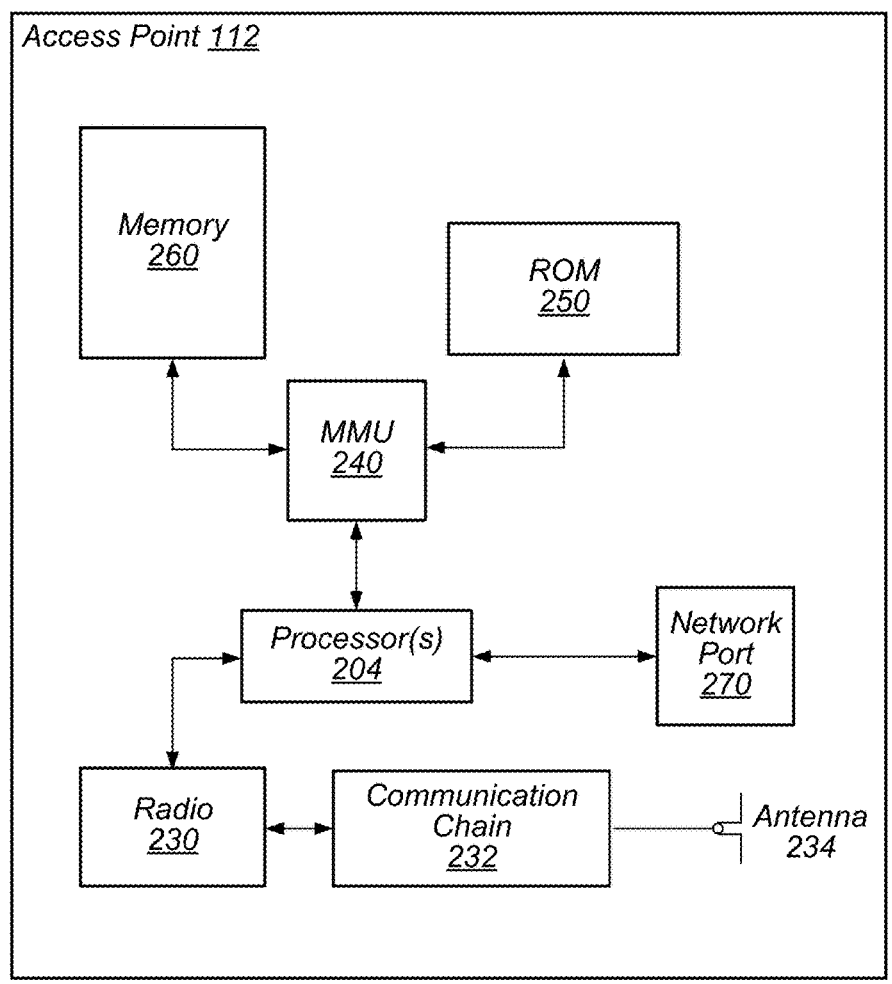
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for scheduling a first communication in one or more time slots with a peer station according to a first radio access technology (RAT), determining an end time of the first communication during a first time slot of the one or more time slots, and transmitting a second communication according to a second RAT where at least a portion of the second communication may be performed during the first time slot. In some embodiments, the first and second communications may be transmitted on the same channel. In some embodiments the first RAT may be Bluetooth and the second RAT may be Wi-Fi.

Figure 3:
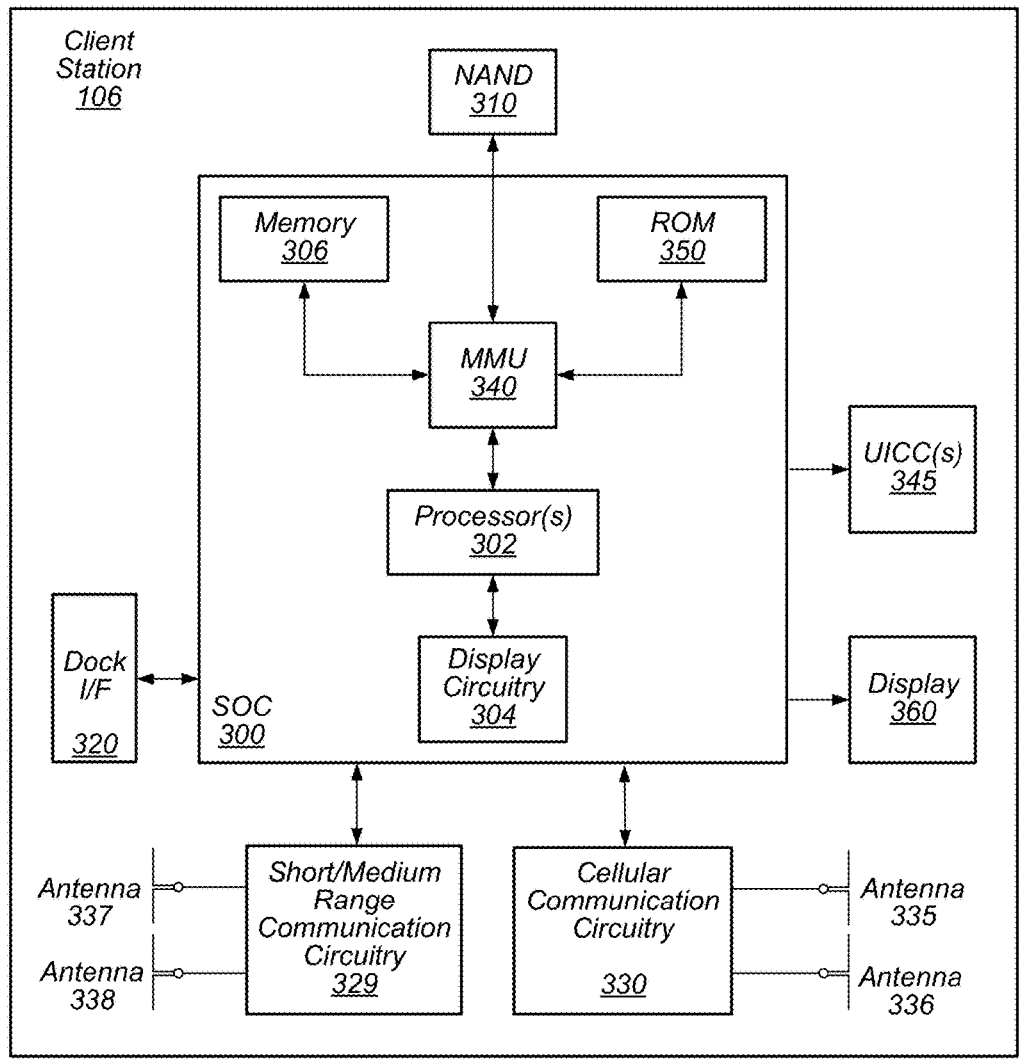
FIG. 3 illustrates an example simplified block diagram of a wireless station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for scheduling a first communication in one or more time slots with a peer station according to a first radio access technology (RAT), determining an end time of the first communication during a first time slot of the one or more time slots, and transmitting a second communication according to a second RAT where at least a portion of the second communication may be performed during the first time slot. In some embodiments, the first and second communications may be transmitted on the same channel. In some embodiments the first RAT may be Bluetooth and the second RAT may be Wi-Fi.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for a NAN device to manage coexistence of multiple radio access technologies during NAN communications.

Multi-RAT Coexistence

According to some implementations, multiple radio access technologies (RATs) may be utilized on a single device (e.g., a single radio/antenna of a device such as client station 106). For example, Bluetooth (BT) and/or Bluetooth Low Energy (BTLE) and Wi-Fi technology may be implemented on a single device and may coexist via sharing of a 2.4 GHz band. In existing implementations, it is common for BT/BTLE (BT) and Wi-Fi transceivers to share a single antenna. In such implementations, BT adaptive frequency hopping (AFH) may be implemented (used) to avoid transmission overlap in frequency; however, depending on transceiver and antenna design, simultaneous BT/Wi-Fi transmission and reception may not be possible and time division duplex (TDD) mode may be required. In particular, TDD mode may be required for Wi-Fi transmit (TX)/BT receive (RX) and Wi-Fi RX/BT TX due to receiver desensing. Thus, in order to reduce unsuccessful transmissions, it may be beneficial to align BT and Wi-Fi transmission schedules for a device. Note that in a NAN setting, such an alignment would need to be communicated to a peer device so that the peer device may avoid transmitting when the device is unable to receive Wi-Fi transmissions and attempting to receive when the device is unable to transmit Wi-Fi transmissions. Avoiding transmissions at the peer device may further avoid retransmissions and data rate reduction and avoiding attempting to receive at the peer device may aid in reducing power consumption of the peer device.

Figure 4:
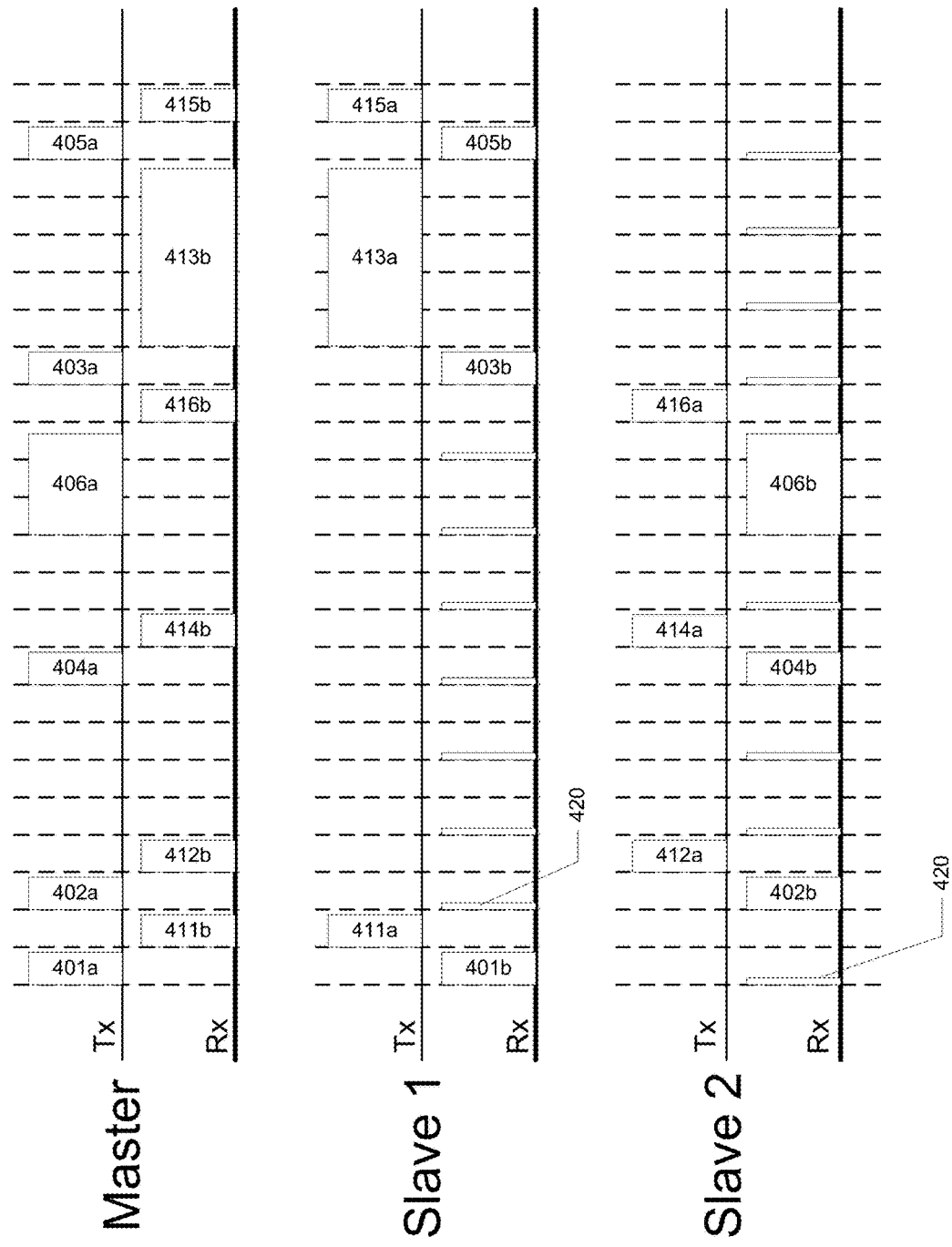
FIG. 4 illustrates an example of Bluetooth communication between a master and slave devices, according to the prior art.

In existing BT implementations, transmission and reception occur at multiples of 625 micro seconds (e.g., a time slot=625 micro seconds). A piconet master is typically a timing reference and up to 7 slaves in a piconet may align to the piconet master. Note that master and slave packets may be transmitted in alternating fashion, as illustrated by FIG. 4. As illustrated, packets (either master or slave) may cover 1 (e.g., packets 401a-b, 402a-b, 403a-b, 404a-b, 405a-b, 411a-b, 412a-b, 414a-b, 415a-b, and 416a-b), 3 (e.g., packets 406a-b), or 5 time slots (e.g., packets 413a-b) and, as illustrated, a slave (e.g., slave 1 or slave 2) may only transmit in a slave to master slot if the slave received a packet from the master in the preceding master to slave slot (except for synchronous connection oriented (SCO)/enhanced SCO (eSCO) links). In addition, as illustrated, the slave may be required to acknowledge a packet from the master in the following slave to master time slot (e.g., packets pairs 401a-b, 402a-b, and so forth). Further, slaves may listen (e.g., packets 420) in each time slot to determine whether data is being transmitted to them. Note further that packets may be sent on an as needed basis, e.g., when an asynchronous connection-less (ACL) link is in active mode or on a fixed schedule, e.g., when an ACL link is in sniff mode (sniff instant/interval/number of attempts) or for an SCO/eSCO link (SCO/eSCO instant, interval, number of eSCO retransmissions).

In some existing implementations, link type may be dependent on use type. For example, one-way stereo audio streaming and control (A2DP/AVCRP) may use an ACL link in active mode, have a flexible schedule (restricted by average bitrate requirements), and allow retransmissions (restricted by latency requirements). As another example, a human input device (HID) (e.g., mouse, keyboard, trackpad) may use an ACL link in sniff mode. As a further example, bi-directional voice audio and call control (HFP) may use an ACL link in sniff mode for call control and an SCO/eSCO link for voice audio.

Figure 5A:
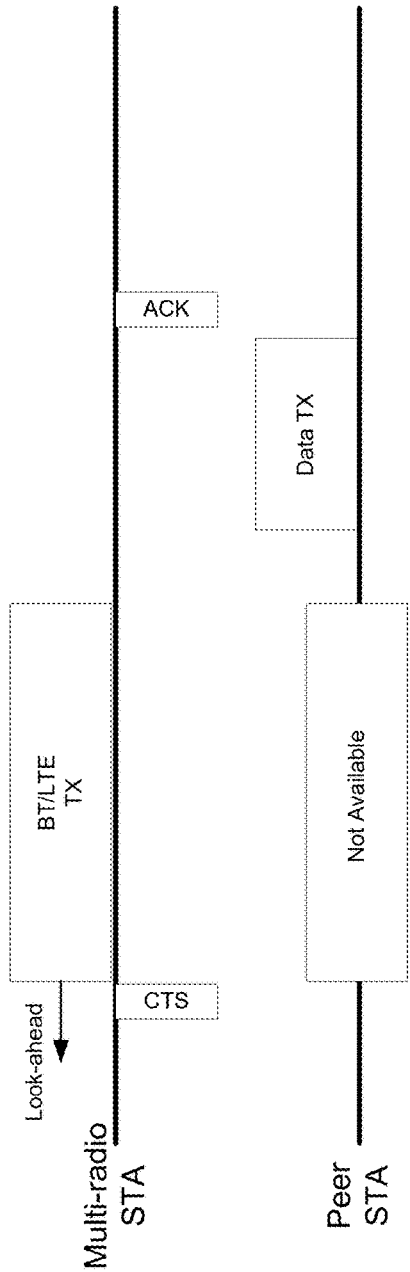
FIGS. 5A and 5B illustrate example Bluetooth/Wi-Fi coexistence schemes, according to the prior art.

In some existing implementations of a multi-radio client station (station), the station may expect to conduct BT/LTE transmissions at certain points in time and for certain periods of time. In other words, the station may have or determine a BT/LTE transmission schedule. Thus, as FIG. 5A illustrates, the station may transmit a Wi-Fi CTS-to-self (clear to send to self) frame in advance to prevent one or more peer stations from transmitting any Wi-Fi frames to the station during the scheduled BT/LTE transmissions (BT/LTE TX). Thus, a peer station may schedule the multi-radio stations unavailability during the scheduled BT/LTE transmissions and then transmit data to the multi-radio station. The multi-radio station may then acknowledge (ACK) the received data. In addition, the station may use existing Wi-Fi power saving schemes to prevent an access point (AP) from transmitting any Wi-Fi frames to the station during the scheduled BT/LTE transmissions.

Figure 5B:
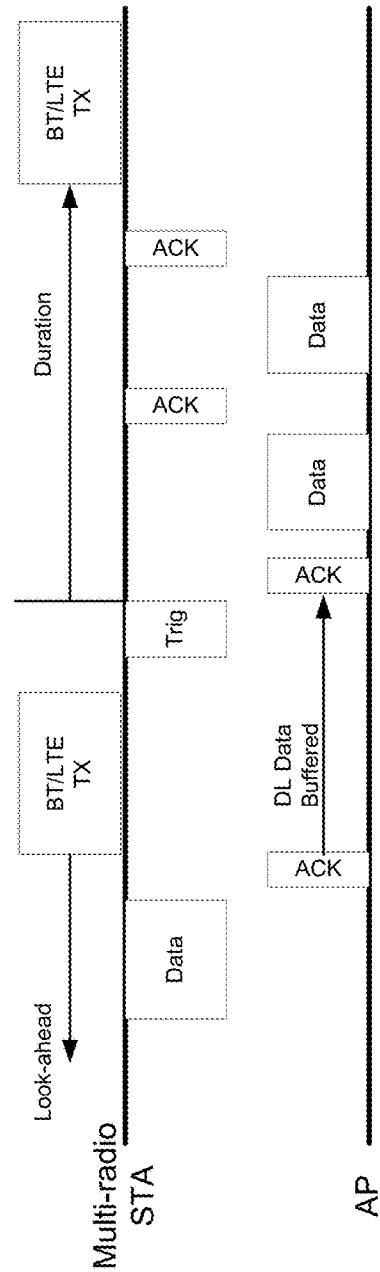

For example, as FIG. 5B illustrates, right before (e.g., approximately immediately prior to) a scheduled BT/LTE transmission, the station may transmit a Wi-Fi frame to the AP with the frame PM (power management) bit set (e.g., data). Note that sufficient look-ahead time may be required to send the frame out before the scheduled BT/LTE transmission. Then, once the AP receives the Wi-Fi frame with the PM bit set (e.g., ACK), the AP may start to buffer all Wi-Fi frames destined for the station. In addition, when the station completes the scheduled BT/LTE transmission, the station may send a trigger frame (trig) to the AP to solicit the buffered Wi-Fi frames (data and station ACKs). Note that the AP may acknowledge the trigger frame with an ACK frame as shown). In addition, if the scheduled BT/LTE transmissions are periodic, the station may also inform the AP of a starting time for a next scheduled BT/LTE transmission and the AP may not transmit any frame to the station during the next scheduled BT/LTE transmission. Alternatively, the station may send a duration between the trigger frame and the next scheduled BT/LTE transmission to the AP.

Figure 5C:
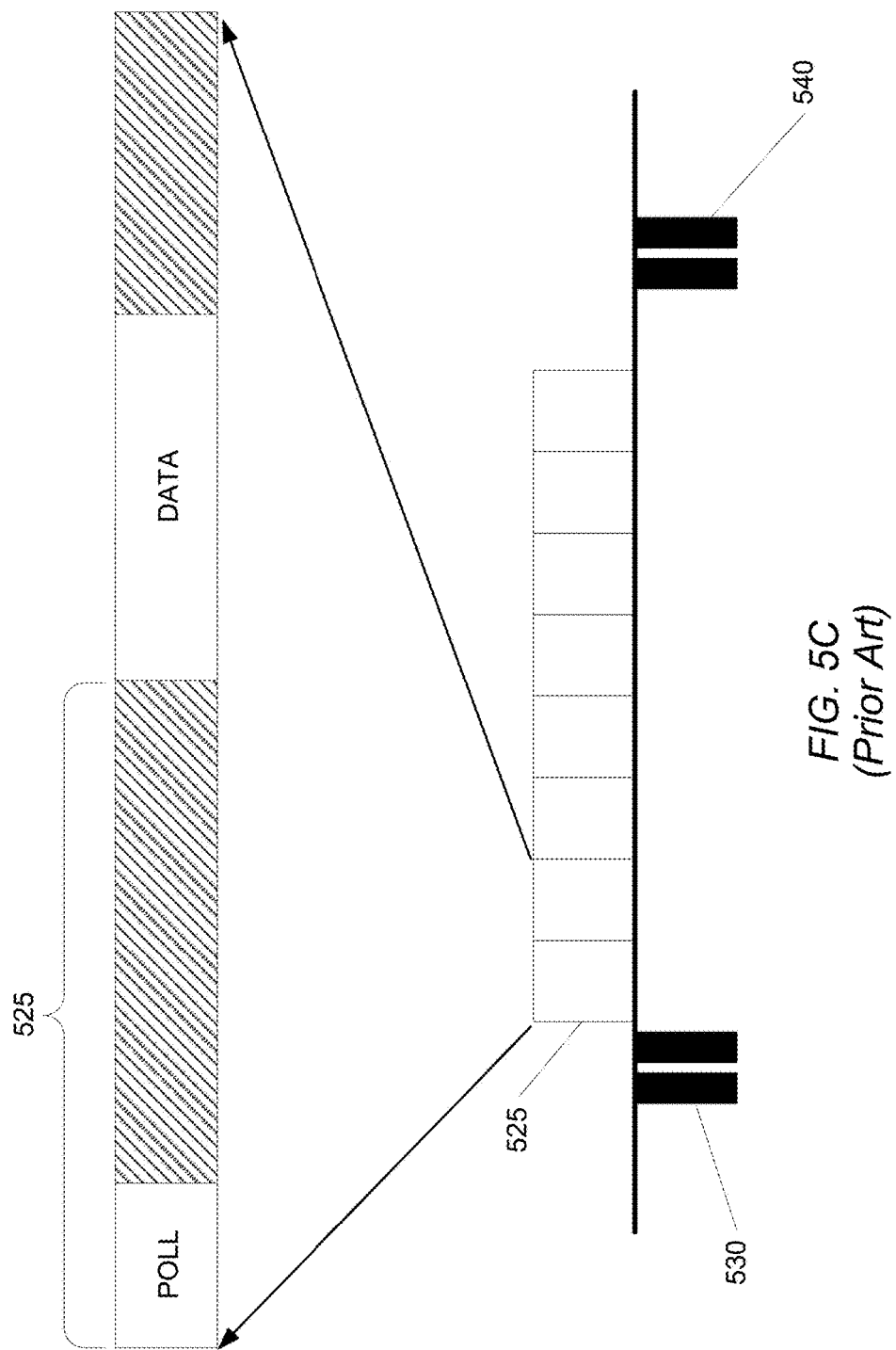
FIG. 5C illustrates an example Bluetooth frame, according to the prior art.

As FIG. 5C illustrates, existing implementations may not take advantage of unused transmission time during scheduled BT transmissions. As shown, a BT frame 525 may include unused portions (hashed regions) after polling and even some data transmissions. Further, time between Wi-Fi stop indication transmission (e.g., 530) and Wi-Fi resume trigger transmission (e.g., 540) may be uncertain due to Wi-Fi medium access uncertainty.

Wi-Fi/BT Coexistence

Embodiments described herein provide techniques for a wireless station (e.g., wireless station 106) to utilize an unused portion of Bluetooth (BT) time slots to transmit Wi-Fi control and/or management frames to access points (e.g., AP 112) and/or peer wireless stations (e.g., via Wi-Fi peer-to-peer protocols such as NAN). In some embodiments, such techniques may achieve more efficient Wi-Fi/BT coexistence.

Figure 6:
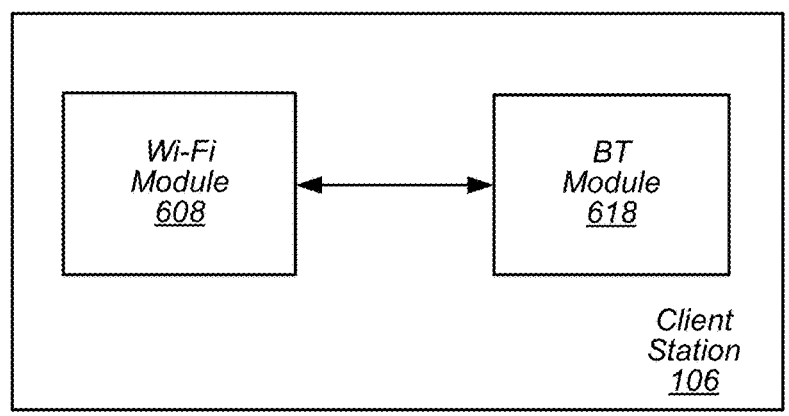
FIG. 6 illustrates another example simplified block diagram of a wireless station, according to embodiments.

According to embodiments, a wireless station such as wireless station 106 may include a BT module 618 and a Wi-Fi module 608 as illustrated by FIG. 6. The modules 608 and 618 may be individually comprised of circuitry (e.g., one or more circuits, one or more processing elements) configured to perform the various functions and features described herein or may be a combination of software and circuitry (e.g., one or more processing elements coupled to one or more memories storing program instructions executable to perform the various features and functions). In some embodiments, to enable the Wi-Fi module 608 to utilize unused portions of BT time slots on a channel for transmission of Wi-Fi control and/or management frames, the BT module 618 may inform the Wi-Fi module 608 of BT transmission and/or receive completion times within a BT time slot. In response, the Wi-Fi module 608 may be ready to access the channel immediately (or substantially/approximately immediately) upon completion of the BT transmission/receive. Note that the BT module 618 may know, or be enabled to determine, a transmission completion time prior to performance of the BT transmission. In addition, the BT module 618 may know, or be enabled to determine, a receive completion time after decoding a frame length information (e.g., before receiving and processing an entire (complete) frame.

Figure 7:
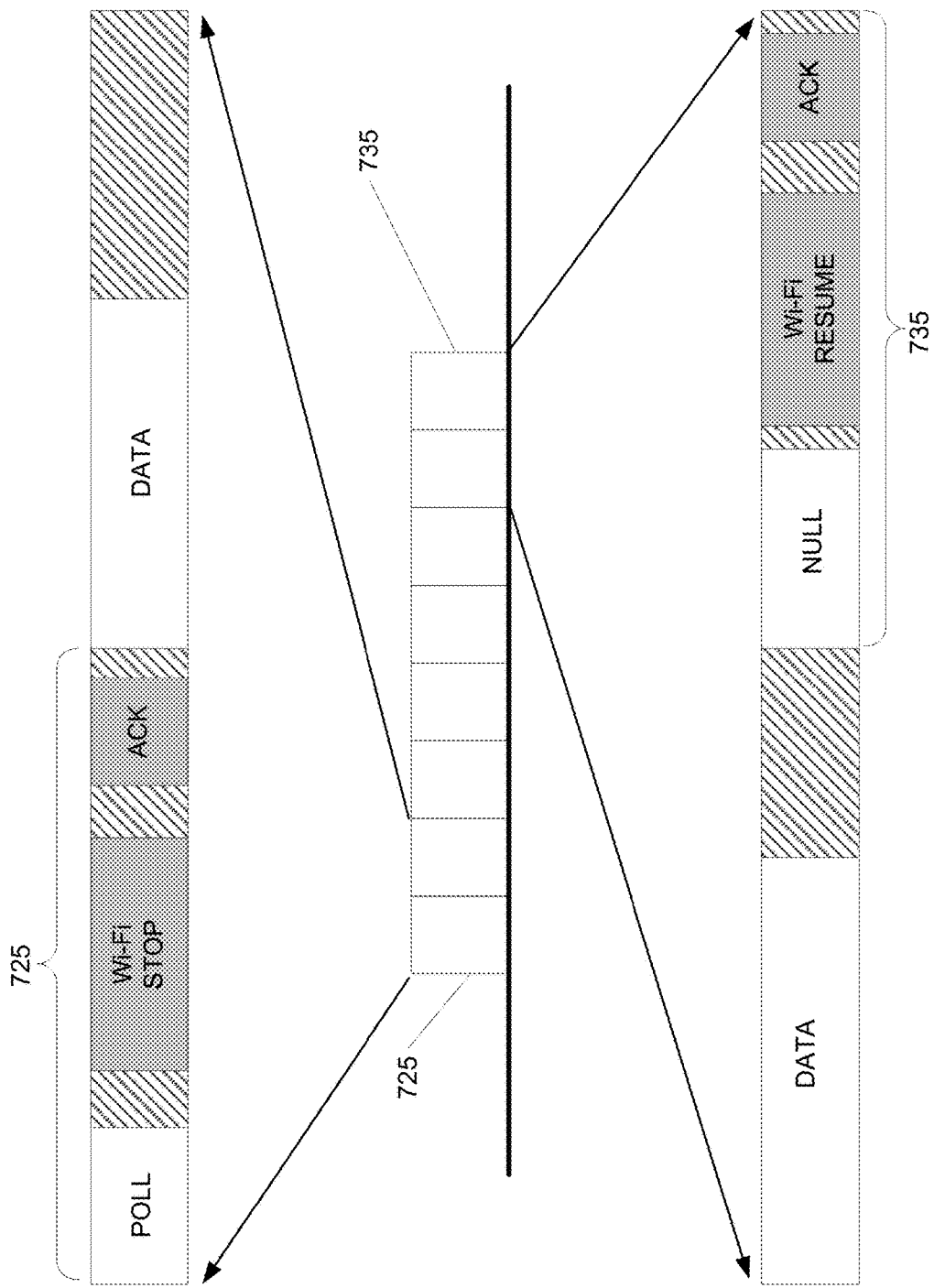
FIG. 7 illustrates an example Bluetooth frame, according to embodiments.

In some embodiments, various medium access rules may be implemented for Wi-Fi module 608 to transmit frames immediately (or substantially/approximately immediately) upon completion of the BT transmission/receive. In other words, protocols may need to be implemented to allow the Wi-Fi module 608 to access the channel used for BT communications. Thus, as FIG. 7 illustrates, in some embodiments, the wireless station 106 may transmit, e.g., during BT frame 725, a Wi-Fi stop transmission indication frame immediately (or substantially/approximately immediately) upon completion of the BT transmission/receive without channel access and backoff. In addition, the wireless station 106 may transmit, e.g., during BT frame 735, a Wi-Fi resume trigger frame immediately (or substantially/approximately immediately) upon completion of the BT transmission/receive without channel access and backoff. In some embodiments, the wireless station 106 may transmit a Wi-Fi stop transmission indication frame or a Wi-Fi resume trigger frame if wireless station determines (assesses) that the medium (e.g., channel) is idle for one of a SIFS (short interframe space), PIFS (point coordination function interframe space) or DIFS (distributed coordination function interframe space) without conducting any additional backoff. In some embodiments, the wireless station 106 may transmit a Wi-Fi stop transmission indication frame or a Wi-Fi resume trigger frame if wireless station determines (assesses) that the medium (e.g., channel) is idle based on 802.11 enhanced distributed channel access (EDCA) rules. Note that in some embodiments, the wireless station 106 may use a combination of these embodiments.

In some embodiments, the wireless station 106 may transmit a Wi-Fi stop frame (e.g., a Wi-Fi stop transmission indication frame) during an unused portion of a BT time slot if there are further BT transmissions and/or receives in one or more additional BT time slots immediately (or substantially/approximately immediately) following the BT time slot and there is sufficient time in the unused portion of the current BT time slot to transition to Wi-Fi transmission mode and complete Wi-Fi channel access, if needed, transmit the stop frame, and receive an immediate acknowledgment, if requested. Note that according to embodiments, the stop frame may be any of a frame with PM bit set (which may request one or more peer wireless stations to start buffering frames for the wireless station 106), a notice-to-absence or any other frame that may indicate to one or more peer wireless stations that the wireless station 106 will be absent for a period of time (e.g. a period of time that includes an end or completion of expected BT transmission/receive), or a CTS-to-self or any other frame that may set the network allocation vector (NAV) of all neighbor wireless stations or desired peer wireless stations for a certain period of time (e.g. a period of time that includes an end or completion of expected BT transmission/receive).

In some embodiments, the wireless station 106 may transmit a Wi-Fi resume frame (e.g., a Wi-Fi resume transmission frame) during an unused portion of a BT time slot if there are no further BT transmissions and/or receives in one or more additional BT time slots immediately (or substantially/approximately immediately) following the BT time slot. Note that transmission of the resume frame, as well as receiving acknowledgment of the resume frame may extend beyond the BT time slot since there is no more BT traffic after the BT time slot. According to embodiments, the resume frame may be any frame that may trigger one or more peer wireless stations to start transmitting buffered frames to the wireless station 106 or any frame that may cancel the absence period or NAV set by the wireless station 106.

FIG. 8A illustrates typical communication patterns of a BT advanced audio distribution profile (A2DP) connection and FIG. 8B illustrates typical communication patterns of a BT enhanced synchronous connection-oriented (eSCO) connection, according to embodiments. Note that the A2DP connection may not be strictly periodic whereas the eSCO connection may be strictly periodic.

As FIG. 8A illustrates, at 812a, a wireless station, such as wireless station 106, may transmit a Wi-Fi stop frame prior to a start of BT traffic (e.g., traffic 802a-f and 804a-f). The Wi-Fi stop frame may indicate (or specify) an expected/predicted BT traffic periodic pattern. Note that for the A2DP case, since the traffic may not be strictly periodic, the wireless station may attempt to transmit the Wi-Fi stop frame immediately (or substantially/approximately immediately) before each BT traffic burst. Note that the wireless station may perform similar transmissions at 812b-c, e.g., prior to transmissions 802c and 802e.

At 814a, if the wireless station is not able to obtain medium access to transmit the Wi-Fi stop frame before a BT traffic burst, the wireless station may still transmit the Wi-Fi stop frame at the end of the first BT time slot of the BT traffic burst, e.g., prior to transmission 804a. Note that the wireless station may perform similar transmissions at 814b-c, e.g., prior to transmissions 804c and 804e.

At 816a, if an earlier Wi-Fi stop frame reserved a protection period longer than the actual BT traffic burst, the wireless station may transmit a Wi-Fi resume frame to trigger a return of the medium to Wi-Fi transmissions. Note that the wireless station may perform similar transmissions at 816b-c.

At 818, the wireless station, may, within a BT traffic burst, transmit an additional Wi-Fi stop frame to extend a protection period dynamically, e.g., in order to accommodate additional transmissions, such as retransmissions.

As FIG. 8B illustrates, at 830, a wireless station, such as wireless station 106, may transmit a Wi-Fi stop frame prior to a start of BT traffic (e.g., traffic 822a-j and 824a-b). The Wi-Fi stop frame may indicate (or specify) an expected/predicted BT traffic periodic pattern.

At 832a, if the wireless station is not able to obtain medium access to transmit the Wi-Fi stop frame before a BT traffic burst, the wireless station may still transmit the Wi-Fi stop frame at the end of the first BT time slot of the BT traffic burst, e.g., prior to transmission 822b. Note that the wireless station may perform similar transmissions at 832b-c, e.g., prior to transmissions 822c and 822h.

At 834a, if an earlier Wi-Fi stop frame reserved a protection period longer than the actual BT traffic burst, the wireless station may transmit a Wi-Fi resume frame to trigger a return of the medium to Wi-Fi transmissions. Note that the wireless station may perform similar transmissions at 834b-c.

In some embodiments, a wireless station (e.g., wireless station 106) may also make use of an unused portion of a BT time slot to transmit short frames or fragmented frames to a peer wireless station (e.g., via the NAN protocol) if a remaining period of the BT time slot is sufficient to conduct required medium access, transmit the short frames or fragmented frames, and receive an acknowledgement from the peer wireless station. Note that according to embodiments, frames transmitted during an unused portion of a BT time slot may be able to inform a peer wireless station to buffer pending transmissions until an end of the expected BT transmissions and/or until the peer wireless station receives a trigger frame from the client station to release the buffered frames.

According to some embodiments, frames transmitted during an unused portion of a BT time slot may also be able to indicate a wireless station's bandwidth or receiving antenna changes to peer wireless stations in order to support simultaneous Wi-Fi/BT operations. For example, if the wireless station (e.g., wireless station 106) includes two or more antennas that may operate on different bands/channels simultaneously, wireless station may reserve one antenna/one channel for BT transmission and receiving and inform peer wireless stations to focus Wi-Fi transmissions on its other antennas (e.g. with reduced number of streams) at a different band/channel. In addition, upon BT transmission completion, the wireless station may indicate to peer wireless stations to resume transmission to the wireless station's full set of antennas.

Figure 9:
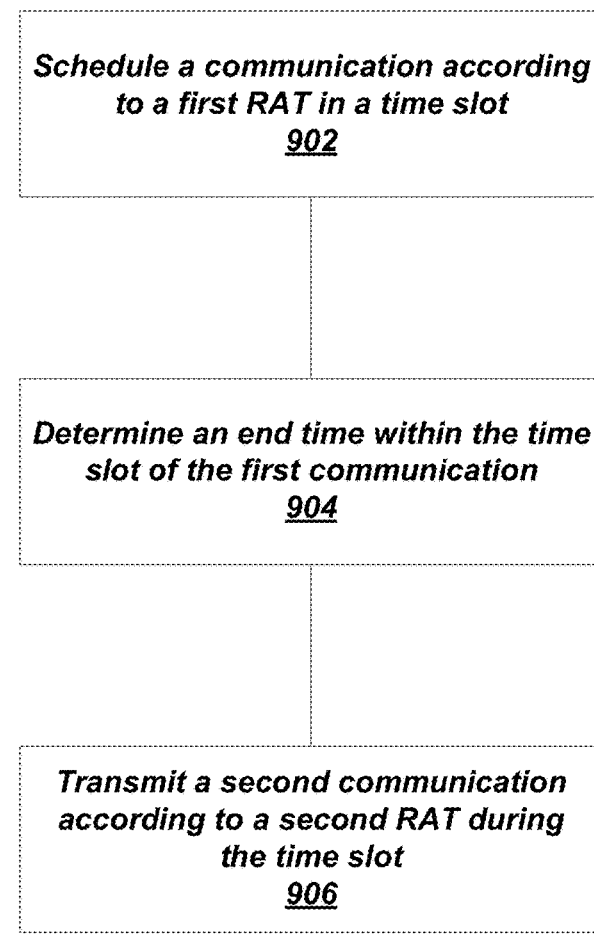
FIG. 9 illustrates a block diagram of an example of a method for performing communications according to a second RAT during a time slot for a scheduled communication according to a first RAT, according to some embodiments.

FIG. 9 illustrates a block diagram of an example of a method for performing communications according to a second RAT during a time slot for a scheduled communication according to a first RAT, according to some embodiments. The method shown in FIG. 9 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 902, a first communication according to a first radio access technology (RAT) may be scheduled in one or more time slots with the at least one neighboring wireless station. The first communication may be scheduled on a channel. The first RAT may be Bluetooth.

At 904, an end time of the first communication during a first time slot of the one or more time slots may be determined. In some embodiments, determining the end time may include determining that a channel used for the first communication is idle. In some embodiments, determining that the channel is idle may include determining that the channel is idle for at least one of a short interframe space, a point coordination function interframe space, and/or a distributed coordination function interframe space. In some embodiments, determining that the channel is idle may include determining that that channel is idle based, at least in part, on enhanced distributed channel access rules.

At 906, a second communication may be transmitted on the channel according to a second RAT to at least one of an access point and one or more neighboring wireless stations. In some embodiments, at least a portion of the second communication may be performed during the first time slot. In some embodiments, the second RAT may be Wi-Fi.

In some embodiments, a message may be transmitted, according to the second RAT, substantially immediately prior to a start of the first communication. The message may indicate a termination of communications according to the second RAT. In some embodiments, the message may be broadcast. In some embodiments, the message may be a stop message/frame such as a Wi-Fi stop message/frame.

In some embodiments, a message may be transmitted, according to the second RAT, substantially immediately at an end of the first communication. The message may indicate a start of the second communication. In some embodiments, the message may be broadcast. In some embodiments, the message may be a resume message or frame such as a Wi-Fi resume message/frame. In some embodiments, the message may be a trigger message or frame such as a Wi-Fi trigger message/frame. In some embodiments, it may be determined that no additional communications according to the first RAT are to be scheduled in one or more time slots substantially immediately following the first time slot prior to transmitting the message.

In some embodiments, a third communication may be scheduled according to the first RAT in a second time slot of the one or more time slots. In such embodiments, determining the end time within the first time slot may include determining that the second communication will end prior to a start of the third communication.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio configured to perform Wi-Fi communication with a Wi-Fi access point and one or more neighboring wireless stations and Bluetooth communication with a first neighboring wireless station of the one or more neighboring wireless stations;
at least one processor coupled to the at least one radio, wherein the wireless station is configured to perform voice and/or data communications;
wherein the wireless station is configured to:
schedule a Bluetooth communication in one or more time slots with the first neighboring wireless station, wherein the Bluetooth communication has an end time;
determine a change to the end time of the Bluetooth communication;
transmit, in response to determining that the change to the end time shortens the Bluetooth communication, a first peer-to-peer Wi-Fi communication to a second wireless station of the one or more wireless stations during the one or more time slots, wherein the first peer-to-peer Wi-Fi communication indicates that at least a portion of the one or more time slots is available for Wi-Fi communications; and
transmit, in response to determining the change to the end time lengthens the Bluetooth communication, a second peer-to-peer Wi-Fi communication to the second neighboring wireless station during the one or more time slots, wherein the second peer-to-peer communication indicates that an additional one or more time slots subsequent to the one or more time slots is not available for Wi-Fi communication.

2. The wireless station of claim 1,
wherein the wireless station is further configured to:
transmit, via Wi-Fi communication, a message substantially immediately prior to a start of the Bluetooth communication, wherein the message indicates a termination of Wi-Fi communications.

3. The wireless station of claim 1,
wherein the wireless station is further configured to:

transmit, via Wi-Fi communication, a message substantially immediately at the end of the Bluetooth communication, wherein the message indicates a start of the Wi-Fi communication.

4. The wireless station of claim 1,
wherein a channel for the Bluetooth communication is used for the Wi-Fi communication.

5. The wireless station of claim 1,
wherein the wireless station is further configured to:
determine the end time by determining that a channel used for the Bluetooth communication is idle.

6. The wireless station of claim 5,
wherein to determine that the channel used for the Bluetooth communication is idle, the wireless station is further configured to determine that the channel is idle based, at least in part, on enhanced distributed channel access rules or that the channel is idle for at least one of:
a short interframe space;
a point coordination function interframe space; or
a distributed coordination function interframe space.

7. The wireless station of claim 1,
wherein the first peer-to-peer Wi-Fi communication comprises a Wi-Fi resume frame.

8. The wireless station of claim 1,
wherein the second peer-to-peer Wi-Fi communication comprises a Wi-Fi stop frame.

9. The wireless station of claim 1,
wherein the schedule reserves an access medium for Bluetooth communication during the one or more time slots.

10. An apparatus, comprising:
a memory; and
a processing element in communication with the memory, wherein the processing element is configured to:
schedule a first communication on a channel in one or more time slots with a first neighboring wireless station of one or more neighboring wireless stations, wherein the first communication is according to a first radio access technology (RAT), wherein the first communication has an end time;
determine a change to the end time of the first communication;
generate instructions to transmit, in response to determining that the change to the end time shortens the first communication, a first peer-to-peer communication a second neighboring wireless station of the one or more neighboring wireless stations during the one or more time slots, wherein the first peer-to-peer communication is according to a second RAT and is transmitted on the channel without obtaining medium access, and wherein the first peer-to-peer communication indicates at least a portion of the one or more time slots is available for communication according to the second RAT; and
generate instructions to transmit, in response to determining the change to the end time lengthens the first communication, a second peer-to-peer communication to the second neighboring wireless station during the one or more time slots, wherein the second peer-to-peer communication is according to the second RAT and is transmitted on the channel without obtaining medium access, and wherein the second peer-to-peer communication indicates that an additional one or more time slots subsequent to the one or more time slots is not available for communication according to the second RAT.

11. The apparatus of claim 10,
wherein the processing element is further configured to:
generate instructions to transmit, according to the second RAT, a message on the channel substantially immediately prior to a start of the first communication, wherein the message indicates a termination of communications according to the second RAT.

12. The apparatus of claim 10,
wherein the processing element is further configured to:
generate instructions to transmit, according to the second RAT, a message on the channel substantially immediately at the end of the first communication, wherein the message indicates a start of the second communication.

13. The apparatus of claim 10,
wherein, to determine the end time, the processing element is further configured to:
determine that the channel is idle.

14. The apparatus of claim 13,
wherein to determine that the channel is idle, the processing element is further configured to determine that the channel is idle for at least one of:
a short interframe space;
a point coordination function interframe space; or
a distributed coordination function interframe space.

15. The apparatus of claim 10,
wherein the first peer-to-peer communication is transmitted at a start of a time slot of the one or more time slots.

16. The apparatus of claim 10,
wherein the first peer to peer communication is transmitted during a portion of a time slot of the one or more time slots.

17. A non-transitory computer readable memory medium storing program instructions executable by a processor to:
schedule a Bluetooth communication on a channel in one or more time slots with a first neighboring wireless station of one or more neighboring wireless stations, wherein the Bluetooth communication as an end time;
determine a change to the end time of the Bluetooth communication; and
generate instructions to transmit, in response to determining that the change to the end time shortens the Bluetooth communication, a first peer-to-peer Wi-Fi communication on the channel without a backoff time to a first neighboring wireless station of the one or more neighboring wireless stations during the one or more time slots, wherein the first peer-to-peer Wi-Fi communication indicates that at least a portion of the one or more time slots is available for Wi-Fi communications; and
generate instructions to transmit, in response to determining the change to the end time lengthens the Bluetooth communication, a second peer-to-peer Wi-Fi communication on the channel without a backoff time to the second neighboring wireless station during the one or more time slots, wherein the second peer-to-peer communication indicates that an additional one or more time slots subsequent to the one or more time slots is not available for Wi-Fi communication.

18. The non-transitory computer readable memory medium of claim 17,
wherein the program instructions are further executable to:
generate instructions to transmit, via Wi-Fi communication, a message on the channel substantially immediately prior to a start of the Bluetooth communication, wherein the message indicates a termination of Wi-Fi communications.

19. The non-transitory computer readable memory medium of claim 17,
wherein the program instructions are further executable to:
generate instructions to transmit, via Wi-Fi communication, a message on the channel substantially immediately at the end of the Bluetooth communication, wherein the message indicates a start of the Wi-Fi communication.

20. The non-transitory computer readable memory medium of claim 19,
wherein the program instructions are further executable to:
determine that no additional Bluetooth communications are to be scheduled in one or more time slots substantially immediately following the firsta time slot prior to transmitting the message.

* * * * *